(12) United States Patent
Tohda et al.

(10) Patent No.: US 6,767,044 B2
(45) Date of Patent: Jul. 27, 2004

(54) ROOF CONSTRUCTION FOR AN AUTOMOTIVE VEHICLE

(75) Inventors: Isao Tohda, Aki-gun (JP); Haruo Ohe, Aki-gun (JP); Kouji Iwasaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/227,534

(22) Filed: Aug. 26, 2002

(65) Prior Publication Data

US 2003/0057727 A1 Mar. 27, 2003

(30) Foreign Application Priority Data

Aug. 27, 2001  (JP) ........................................ 2001-255935
Aug. 27, 2001  (JP) ........................................ 2001-255936

(51) Int. Cl.[7] ............................... B60J 1/02; B60J 7/047
(52) U.S. Cl. ............................... 296/107.01; 296/96.18; 296/108
(58) Field of Search ........................... 296/96.18, 96.19, 296/97.1, 97.9, 97.11, 107.01, 107.08, 108, 215

(56) References Cited

U.S. PATENT DOCUMENTS

| | | | | |
|---|---|---|---|---|
| 2,257,951 A | * | 10/1941 | Haberstump | 296/96.21 |
| 5,061,003 A | * | 10/1991 | Gabas | 296/97.1 |
| 5,188,419 A | * | 2/1993 | Liethen | 296/190.1 |
| 5,558,388 A | * | 9/1996 | Furst et al. | 296/107.2 |
| 5,584,522 A | | 12/1996 | Kerner et al. | |
| 6,416,110 B1 | * | 7/2002 | Haecker et al. | 296/107.01 |
| 6,666,495 B2 | * | 12/2003 | Nania | 296/107.08 |
| 2003/0057727 A1 | * | 3/2003 | Tohda et al. | 296/107.01 |
| 2004/0036314 A1 | * | 2/2004 | Guillez et al. | 296/108 |

FOREIGN PATENT DOCUMENTS

| | | | | |
|---|---|---|---|---|
| DE | 3721895 A1 | * | 1/1989 | 296/107.01 |
| DE | 3733892 A1 | * | 4/1989 | 296/107.17 |
| DE | 3815078 | * | 11/1989 | 296/107.01 |
| FR | 2694245 A1 | * | 2/1994 | 296/107.01 |
| JP | 01-114513 A | * | 5/1989 | 296/215 |
| JP | 5-213066 | | 8/1993 | |
| JP | 07-069070 A | * | 3/1995 | 296/108 |
| JP | 8-85344 | | 4/1996 | |

* cited by examiner

Primary Examiner—D. Glenn Dayoan
Assistant Examiner—Paul Chenevert
(74) Attorney, Agent, or Firm—Nixon Peabody LLP; Donald R. Studebaker

(57) ABSTRACT

A roof construction for a vehicle that uncovers a roof space above a passenger compartment of a vehicle body and covers the roof space, partly or fully, comprises a roof assembly, e.g. front, intermediate and rear roof panels, that is movable relatively to the vehicle body in a longitudinal direction of the vehicle body so as to selectively shift between three positions, namely a closed position where the roof space is fully closed, a partly open position where the roof space is partly open and a fully open position where the roof space is fully open and a prop link mechanism operative to shift the roof assembly into a selected one of the three positions and to fixedly support the roof assembly in the selected position. During shifting the roof assembly into a selected position, the front and intermediate roof panels are superposed and held horizontally in position.

8 Claims, 12 Drawing Sheets

ROOF CONSTRUCTION FOR AN AUTOMOTIVE VEHICLE

BACKGROUND OF THE INVENTION

1. Field of the Invention

This invention relates to a roof construction for an automotive vehicle.

2. Description of Related Art

Automotive vehicles have a roof, movable or stationary, that extend rearward from a top of a front windshield so as to cover a roof space above a passenger compartment. There are too types of roof for automotive vehicles. One type of roof is a sunroof that opens and closes a rectangular opening formed in the roof of the automotive vehicle. Another type of movable roof is a convertible roof that is movable between a closed position where the convertible roof covers a roof space above a passenger compartment to a retracted or fully open position where the convertible roof retracts behind the passenger's seat or within a trunk and fully uncover or open the roof space above the passenger compartment. One of the convertible type roofs that is known, for example, from Japanese Unexamined Patent Publications Nos. 5-213066 and 8-85344 comprises a plurality of roof panels into which the roof is divided in the longitudinal direction of the automotive vehicle. This convertible type roof is capable of shifting between three positions, namely a closed position where the convertible roof fully closes or covers the roof space above the passenger compartment, a partly open position where the convertible roof partly opens or uncovers the roof space above the passenger compartment, and a fully open position where the convertible roof fully opens or uncovers the roof space above the passenger compartment.

While the vehicle stops, the convertible roof safely shifts between the closed position and the retracted position without being affected by wind. It is desirable for the convertible roof to shift its operating position even while the vehicle is moving.

From the viewpoint of designing a vehicle body and improving a feeling of openness of the vehicle with the roof space fully uncovered, it is conceived desirable to position a top edge of a front windshield as low as possible. In this instance, in order to provide an assured head clearance between the convertible roof and the top of passenger's head, the convertible roof at a part adjacent to the passenger's head is hardly positioned too low. In the case of assuring a sufficient head clearance between the passenger's head and the convertible roof in addition to positioning the top edge of a front windshield as low as possible, the convertible roof at its front portion continuous from the front windshield must extend upright or obliquely upward. However, the convertible roof having an upright or oblique front portion hinders passenger's vision or makes a forward field of vision marrow.

SUMMARY OF THE INVENTION

It is therefore an object of the invention to provide a convertible roof construction for a vehicle body that selectively shifts its operating position between three positions, namely a closed position, a partly open position and a frilly open position, while the vehicle is moving.

It is another object of the present invention to provide a convertible roof construction for a vehicle body that provides a broad forward field of vision even though the convertible roof extends continuously from a top edge of a front windshield that is positioned as low as possible.

The foregoing objects of the present invention are accomplished by a roof construction for a convertible roof of a vehicle that variably covers and uncovers a roof space above a passenger compartment of a vehicle body.

According to one aspect of the present invention, the convertible roof comprises a roof assembly is movable relative to the vehicle body in a longitudinal direction of the vehicle body from the front to the back so as to selectively shift its operating position between three positions, namely a closed position where the convertible roof covers the roof space above a passenger compartment of a vehicle body, a partly open position where the convertible roof partly uncovers the roof space and a fully open position where the convertible roof fully uncovers the roof space and a prop link means for shifting the roof assembly into a selected one of the three positions and fixedly supporting the roof assembly in the selected position.

The convertible roof of the present invention having the roof assembly that is always propped as it is shifted in operating position is shifted to any desired operating position even while the vehicle is moving.

The roof assembly may comprise a front roof panel positioned horizontally in the closed position, an intermediate roof panel positioned horizontally in the closed position, and a rear roof panel provided with a rear windshield therein. In this instance, each of the three roof panels is movable in the longitudinal direction and continuing into another roof panel adjacent to the each roof panel in the closed position so as to form a continuous smooth outer surface of the roof assembly. The front roof panel is moved rearward so as to be superposed on the intermediate roof panel in the partly open position. Further, the rear roof panel is laid down and stacked with the front roof panel and the intermediate roof panel remaining superposed in the fully open position.

The roof assembly forms a smooth continuous outer surface while it is in the closed position, so as to provide an attractive exterior appearance of the vehicle body. While the roof assembly is in the partly open position, the occupant is provided with a feeling of openness and, in addition, the front roof panel is superposed on and stably supported by the intermediate roof panel. Further, in the fully open position, the rear roof panel is stacked with the front roof panel and the intermediate roof panel remaining superposed, so that the storage space for the roof assembly can be compact. In addition, in the fully open position, the rear roof panel is inclined with an inner surface facing upward and the front roof panel and the intermediate roof panel remaining superposed are put approximately horizontally. In this instance, the rear roof panel provided with a rear windshield is often formed to have an interior surface concave to the passenger compartment. In consequence, the rear roof panel in the fully open position is stacked with the front and intermediate roof panels remaining superposed without mechanically interfering with each other and all the three roof panels can be superposed closely one on top of another.

The vehicle body has a storage space for receiving the rear roof panel stacked with the front roof panel and the intermediate roof panel between a rearmost seat and a trunk compartment. When the roof assembly is in the fully open position, the rear roof panel is laid so as to put a rear end thereof approximately even with a front end of a rear body portion, such as a trunk lid, of the vehicle body and a front end thereof spatially below the rear end of the rear body portion. Further, the front roof panel and the intermediate roof panel remaining superposed may be laid approximately horizontally and even with the front end of the trunk lid.

The rear roof panel thus inclined forward down in the fully closed position is advantageous to making the lengthwise distance of the storage space for the roof assembly short and eliminating a difference in height between the rear roof panel and the trunk lid so as thereby to uncover almost the entire area of the trunk compartment. This is desirable for the roof assembly to be brought into the fully closed position with leaving the rearmost seat in its uprise position. In addition, this is desirable for an attractive appearance of the vehicle body while the roof assembly is in the fully open position.

The roof assembly may be shifted into any one of the three positions even while the vehicle is moving. Further, each of the front and intermediate roof panels may be shifted in position remaining approximately horizontal so as to make a down wind loading that the roof panels receive on a shift in position even during moving as small as possible. This makes it easy to shift the roof assembly among the three positions even while the vehicle is moving.

The roof assembly may be held in the closed position by propping a part of the roof assembly against a stationary part of the vehicle body. This realizes firm support of the roof assembly in the closed position.

The roof assembly may be further supported by a front windshield and a side door windshield drawn up from a side door while it is in the closed position. This also realizes firm support of the roof assembly in the closed position.

The convertible roof may further comprise detecting means for detecting a passenger who is getting on and off the vehicle and control means for automatically causing the prop link mechanism to shift the roof assembly into the partly open position when the detecting means detects the passenger. This is advantageous to providing a spacious entrance space for a passenger getting on or off the vehicle even when the vehicle body is low in vehicle height.

According to another aspect of the present invention, the roof assembly has a roof opening formed in a front end portion of the roof assembly, e.g. a front roof panel in the case where the roof assembly comprises front, intermediate and rear roof panels, that extends upward continuously from a top edge of a front windshield of the vehicle and a transparent pane installed in the roof opening. The roof assembly may further comprise a light shielding plate movable between at least a covering position where the light shielding plate covers fully the transparent pane and an uncovering position where the light shielding plate uncovers fully the transparent pane. The roof opening in the front portion of the roof assembly is located higher in vertical position than the top edge of the front windshield and is formed at an intermediate part of the roof assembly in a transverse direction of the vehicle body, preferably, before a head of a passenger sitting on a foremost seat. At least a part of the roof assembly, e.g. a front roof panel, may be movable relatively to the vehicle body in a longitudinal direction of the vehicle body from the front to the back so as to partly open the roof space.

The roof assembly thus constructed is desirable for a passenger in the vehicle to gain assured provides forward vision, in particular high forward vision, through the roof opening even though the front windshield at its top edge is lower in vertical position. Further, the roof assembly is desirable in order to provide a passenger in the vehicle with a feeling of release and to introduce wind into the passenger compartment during moving. In addition, the light shielding plate is operative as a sunshade. The transparent pane may be comprise a wide-angle lens in order to provide a wide forward field of vision.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE PREFERRED EMBODIMENTS

The following description will be directed to a two-seater type automotive vehicle provided with a convertible roof according to an embodiment of the present invention that is divided into a plurality of, for example three, roof panels in the longitudinal direction of the vehicle body. The convertible roof is of a type that selectively shifts its operating position between three operative modes or position, namely a closed position in which a given roof space above a passenger compartment is fully closed, a partly open position in which the roof space is partly opened, and a fully open position in which the roof space is fully opened.

Figure 1:
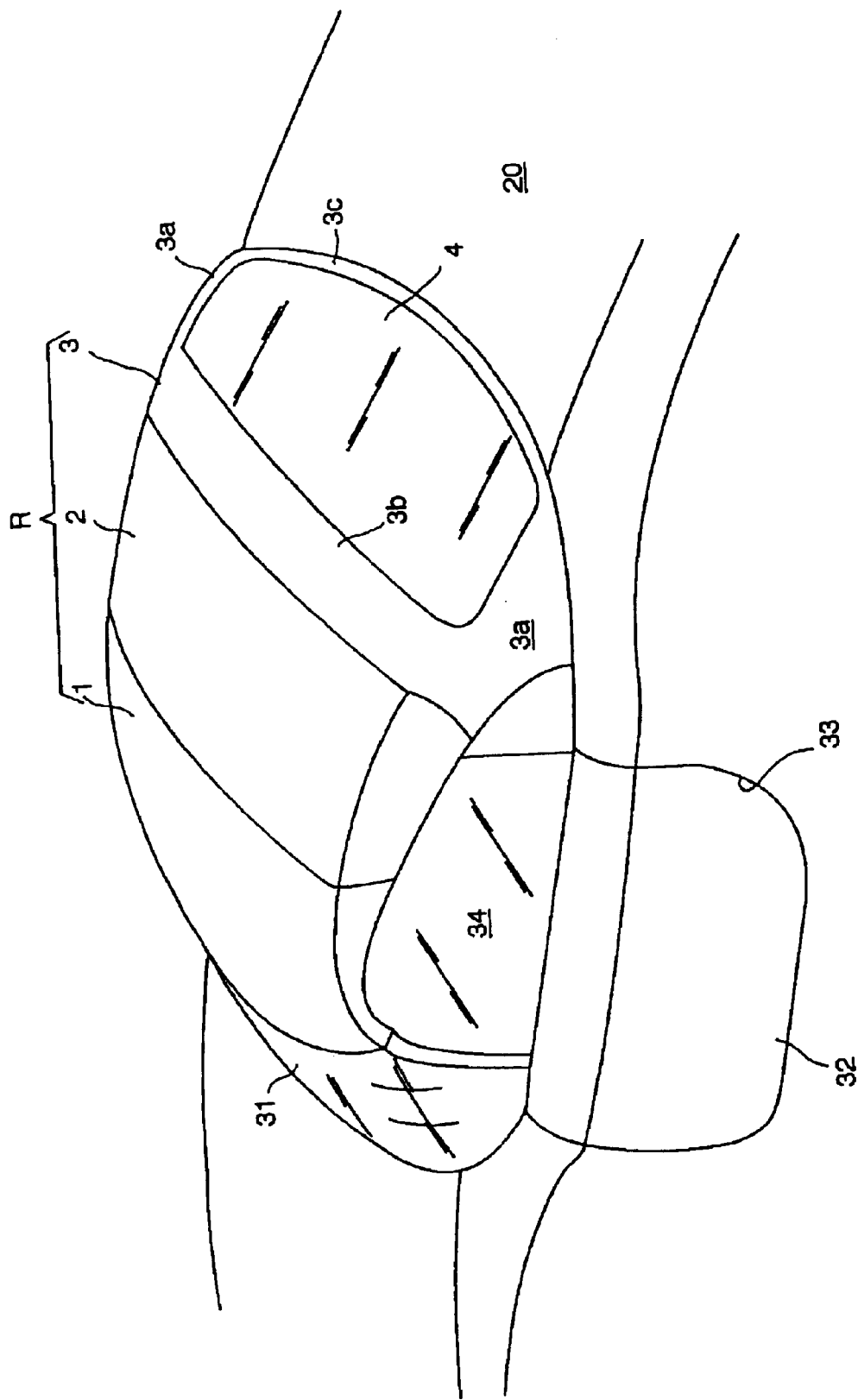
FIG. 1 is a schematic perspective view of a vehicle body equipped with a convertible roof according to an embodiment of the present invention in which the convertible roof is in a closed position.
Figure 2:
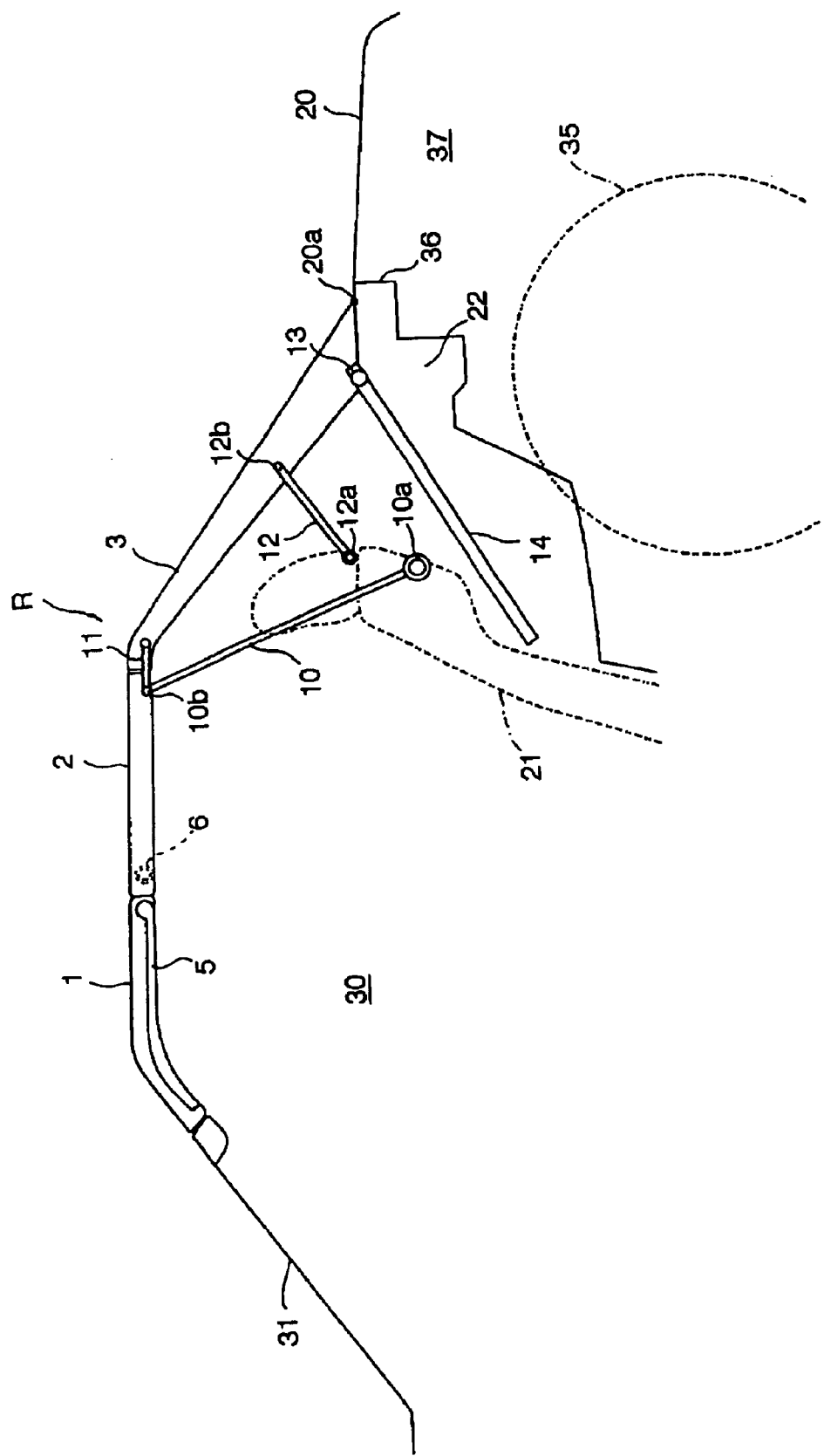
FIG. 2 is a schematic side view of the vehicle body shown in FIG. 1.

Referring to the drawings in detail, and in particular to FIGS. 1 and 2 showing a two-seater type automotive vehicle having a convertible roof assembly R according to an embodiment of the present invention, the vehicle has a passenger compartment 30 and a trunk compartment 37 separate from the passenger compartment 30 by a partition wall 36 and located above rear wheels 35 (one of which is hidden) and is provided with a front windshield 31, door windshields 34 installed in right and left side doors 32, respectively, for opening and closing side openings 33 formed in a side body portion and a convertible roof assembly R. The front windshield 31 at its top edge is provided with a front header 52 covered with a trim strip 53 (see FIG. 8). The partition wall 36 extends and continues into a floor panel (not shown) of the vehicle. The convertible roof assembly R extends from the top edge of a front windshield 31 to a front end of a trunk lid 20 and consists of three roof panels, namely a front roof panel 1 forming a front part of the convertible roof assembly R, an intermediate roof panel 2 forming an intermediate part of the convertible roof assembly R, and a rear roof panel 3 forming a rear part of the convertible roof assembly R, the respective roof panels 1, 2 and 3 being movable with respect to the vehicle body. The front roof panel 1 has a slightly down-curved nose portion. The rear roof panel 3 is formed with a rear window frame comprising right and left rear window pillars 3a, a rear header frame 3a and a rear lower frame 3c. A rear windshield 4 is fitted in the rear window frame. Each roof panel 1–3 extends along a full width of a roof space above the passenger compartment 30 in the transverse direction and is movable in a longitudinal direction of the vehicle body. Although the rear windshield 4 is of a hard type such as a hard glass plate, it may be of a soft type such as a soft plastic sheet.

Figure 3:
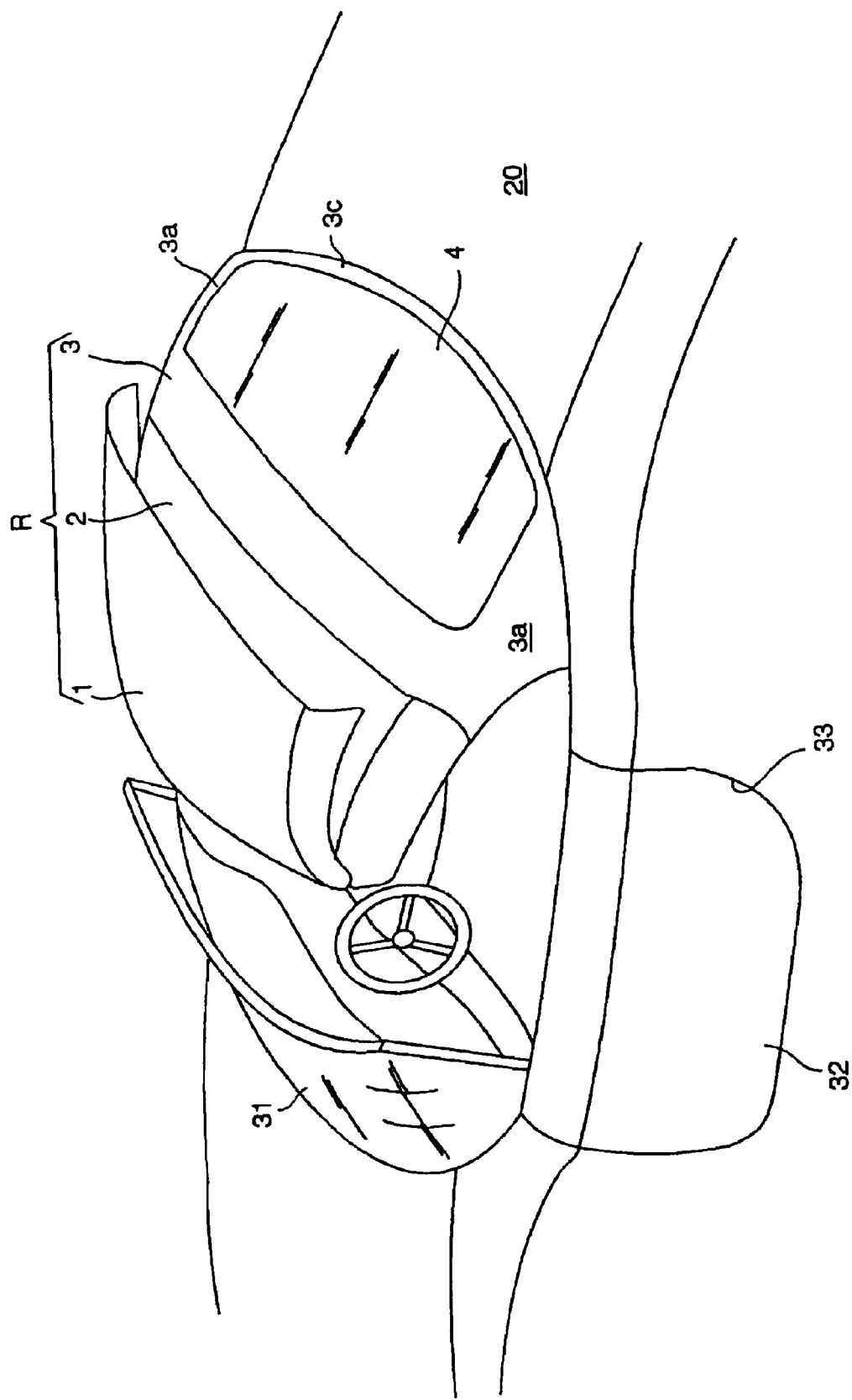
FIG. 3 is a schematic perspective view of the vehicle body in which the convertible roof is in a partly open position.
Figure 4:
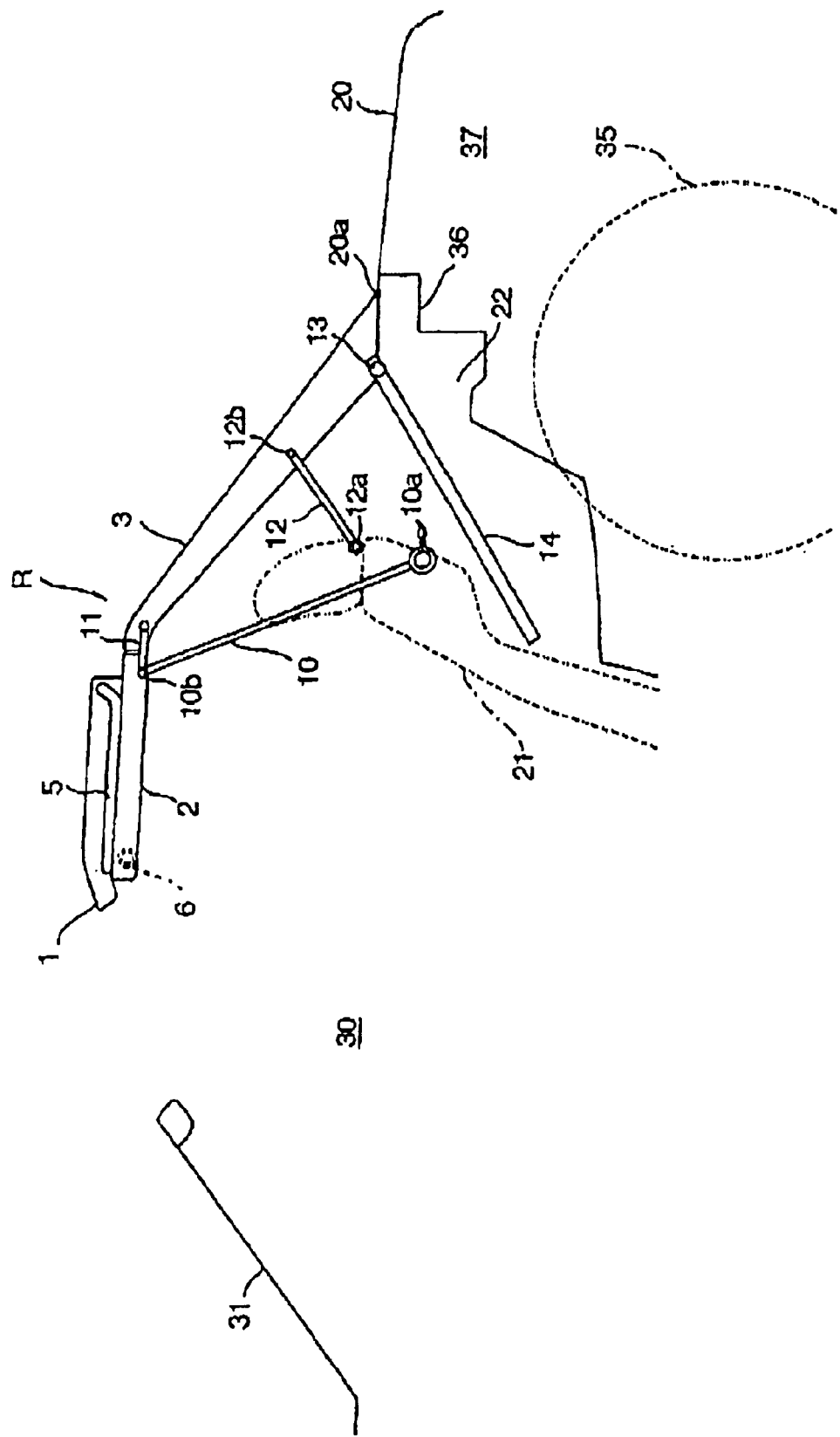
FIG. 4 is a schematic side view of the vehicle body shown in FIG. 3.

The front roof panel 1 is connected to the intermediate roof panel 2 by a slidable link mechanism through which the front roof panel 1 slides back and forth in the longitudinal direction from its closed position (the closed position of the convertible roof assembly R) shown in FIGS. 1 and 2 to its open position (the partly open position of the convertible roof assembly R) shown in FIGS. 3 and 4 where the front roof panel 1 is fully superposed on the intermediate roof panel 2. Specifically, the slidable link mechanism comprises, for example, right and left guiding rails 5 provided at opposite sides of the front roof panel 1 and extending in the longitudinal direction, right and left guiding carriages (not shown) provided at opposite sides of the intermediate roof panel 2 and movably engaging with the guiding rails 5, respectively, and a first reversible motor 6 mounted on the intermediate roof panel 2 that moves the front roof panel 1 back and forth in the longitudinal direction. The guiding rails 5 are shaped so as to lift upward a little and then shift toward the back in parallel with the intermediate roof panel 2 until the front roof panel 1 overlies fully on the intermediate roof panel 2 while being moved by the first motor 6.

The intermediate roof panel 2 is supported in its closed position by a link mechanism while the convertible roof assembly R is in the partly open position as well as in the closed position. The link mechanism is known in various forms and takes any form well known to those in the art. The link mechanism comprises, for example, right and left link levers 10, right and left guiding grooves 11 and a second reversible motor (not shown). Each link lever 10 is pivotally mounted on a stationary pivot 10a secured to a side body portion of the vehicle at a lower end thereof and is provided with a guiding carnage 10b secured to a top end thereof. The guiding groove 11 extends over from a rear end portion of the intermediate roof panel 2 to a front end portion of the rear roof panel 3. The guiding carnage 10b, that operates as a slider, is movable in the guiding groove 11 from one end to another. The second motor that is secured to the side body portion of the vehicle is linked with the link lever 10 so as to turn in clockwise and counterclockwise directions about the pivot 10a. The guiding carnage 10b is positioned at one of the extreme ends of the guiding groove 11 when the intermediate roof panel 2 is in its unfolded position (both closed position and partly open position of the convertible roof assembly R) and is positioned at another extreme end of the guiding groove 11 when the intermediate roof panel 2 is in its folded position (the fully open position of the convertible roof assembly R).

The rear roof panel 3 at a rear end is pivoted on pivots 20a secured to the lid 20 of the trunk compartment 37 behind a seatback 21 of driver's and front passenger's seats (which will be referred to as front seats for simplicity) and is supported in its unfolded position (the closed position and the partly open position of the convertible roof assembly R) by right and left link arms 12. The link lever 12 is pivotally mounted on a pivot 12a secured to the side body portion of the vehicle at its lower end and on a pivot 12b secured to a middle portion of the rear roof panel 3 at its upper end. The link lever 12 of the rear roof panel 3 is shorter in length than the link lever 10. The rear roof panel 3 at each of opposite rear sides has a guiding carriage 13 engaging with a guiding rail 14. The guiding rail 14, that is either formed in the side body portion of the vehicle or otherwise provided separately from and secured to the side body portion, has one end positioned adjacently to and an approximately even height of the front end of the trunk lid 20 and slants forward down from the horizontal so as to extends to immediately behind the seatback 21 of the passenger's seat in its uprise position. The guiding carriage 13 is positioned at one of the extreme ends of the guiding rail 14 when the rear roof panel 3 is in its unfolded position (both closed position and partly open position of the convertible roof assembly R) and is positioned at another extreme end of the guiding groove 11 when the rear roof panel 3 is in its folded position (the fully open position of the convertible roof assembly R).

As shown in FIGS. 2 and 3, the rear roof panel 3 is shaped so as to continue into the trunk lid 20 in a smooth curve when it is in the unfolded position. The vehicle has a storage space 22 for the convertible roof assembly R folded into the fully open position between the seatback 21 of the passenger's seat in its uprise position and the trunk compartment 37. Although the vehicle is of a two-seater type in this embodiment, it may be of a type having rear passenger seats behind the driver's and front passenger's seats, respectively. In this case the seatback 21 is of the rear passenger seats.

In the operation of the convertible roof assembly R, while the convertible roof assembly R is in the closed position shown in FIGS. 1 and 2 where it covers over the roof space above the passenger compartment 30, the front and intermediate roof panels 1 and 2 in coupled and approximately horizontal formation is supported by the front windshield 31 at the front end of the front roof panel 1 and the link levers 10 at the rear end of the intermediate roof panel 2. Both the front and intermediate roof panels 1 and 2 at their opposite sides are supplementarily supported by the door windows 34 in their closed position. On the other hand, the rear roof panel 3 is supported by the link lever 12 and the guiding carriage 13. When the first motor 6 is actuated in the normal direction in order to bring the convertible roof assembly R into the partly open position, the front roof panel 1 is caused to lift upward and then to continuously shift in parallel rearward until it overlies fully on the intermediate roof panel 2, so as thereby to open partly the roof space as shown in FIGS. 3 and 4. When the first motor 6 is actuated in the reverse direction, the convertible roof assembly R is returned into the closed position as shown in FIGS. 1 and 2.

When the convertible roof assembly R is even in the closed position or in the partly open position, the down-curved nose portion of the front roof panel 1 receives a down wind loading due to the wind of the speeding vehicle. In consequence, the front roof panel 1 is pressed against the top of the front windshield 31 when it is in the closed position or against the intermediate roof panel 2 when it is in the open position, so as to be kept in a stable condition in both closed position and partly open position.

Figure 5:
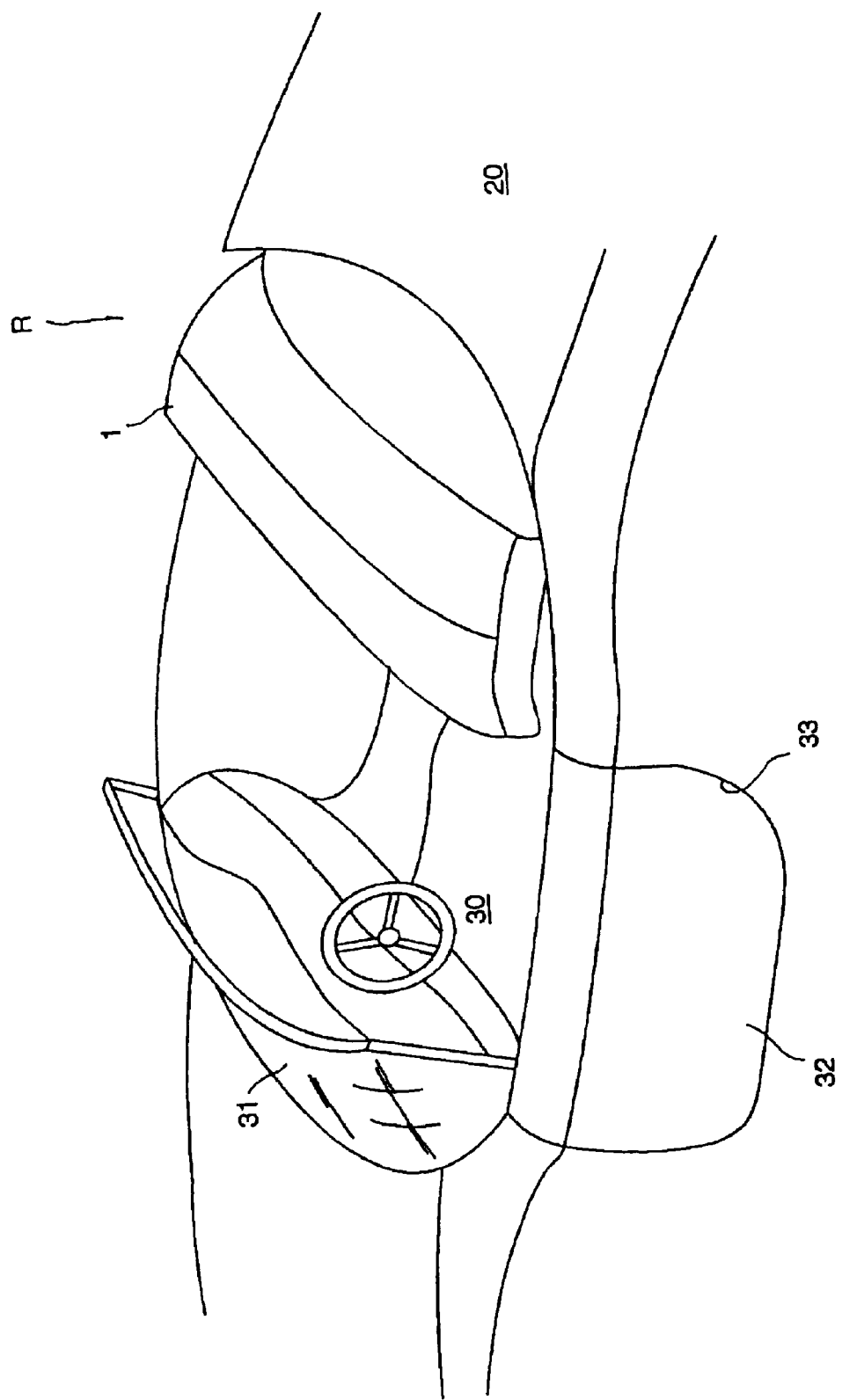
FIG. 5 is a schematic perspective view of the vehicle body in which the convertible roof is in a fully open position.
Figure 6:
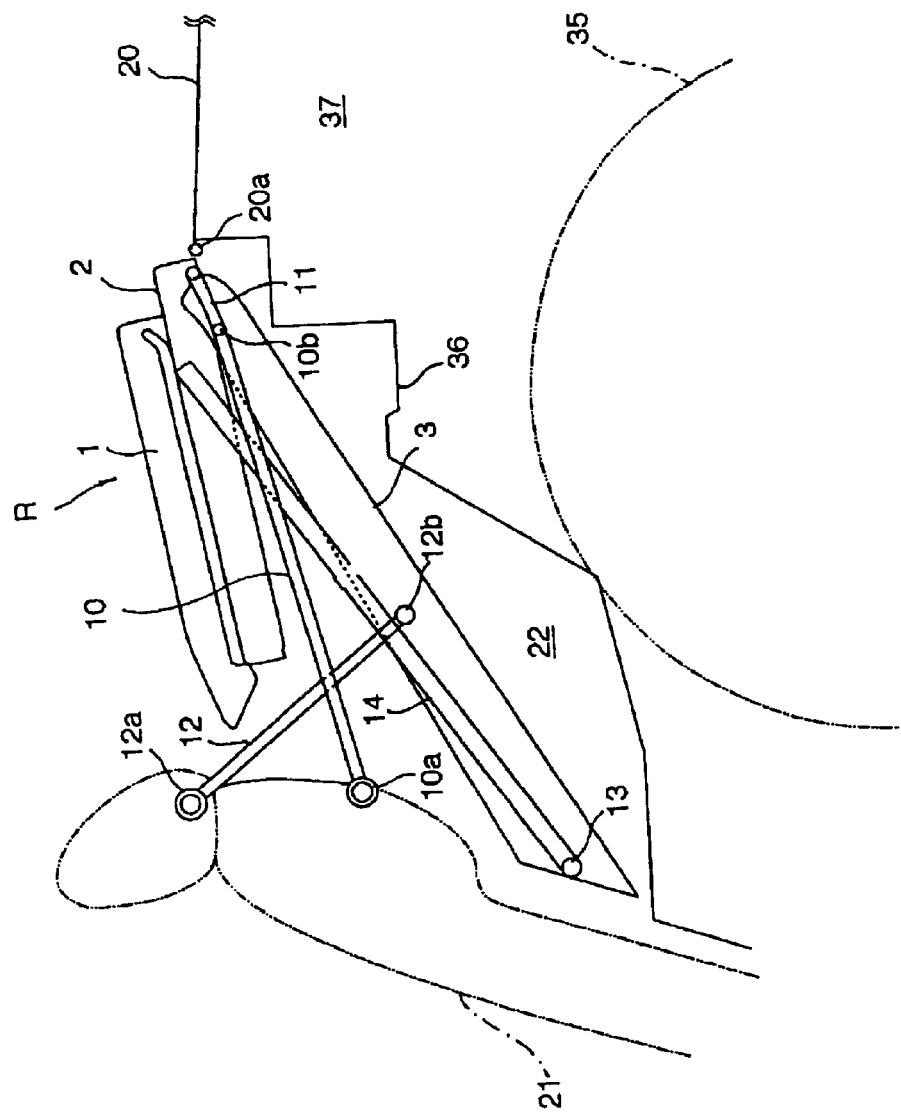
FIG. 6 is a schematic side view of the vehicle body shown in FIG. 4.

When the second motor is actuated in the normal direction in order to bring the convertible roof assembly R into the fully open position from the partly open position, the link lever 10 is forced to turn in the clockwise direction about the pivot 10a. The clockwise turn of the link lever 10 is followed by a clockwise turn of the link lever 12 about the pivot 12a. As a result, the rear roof panel 3 is turned in the clockwise direction about the pivot 12b and retracts the rear end first into the storage space 22 through guidance of the guiding carriage 13 slidably engaging with the guiding rail 14, so as thereby to bring the convertible roof assembly R into the fully open position as shown in FIGS. 5 and 6. When the convertible roof assembly R is in the fully open position, the rear roof panel 3 is situated with the inner surface up and slants forward down almost all along the guiding rail 14. In addition, when the convertible roof assembly R is in the fully open position, the rear ends of the first and intermediate roof panels 1 and 2 superposed on each other are near in the same level with the trunk lid 20. The horizontal formation of the first and intermediate roof panels 1 and 2 superposed on each other is maintained even while the convertible roof assembly R, so as to cover almost the entire opening above the storage space 22.

When the second motor is actuated in the reverse direction, the convertible roof assembly R is returned into the partly open position as shown in FIGS. 3 and 4.

The convertible roof assembly R can be brought into the partly open position from the closed position and further into the fully open position or vice versa even while the vehicle is moving by operating a position selection switch (not shown) disposed in the inside of the passenger compartment 30. During a shift in position of the convertible roof assembly R, the horizontal formation of the first and intermediate roof panels 1 and 2 superposed on each other is always maintained, so that the they are hard to receive moving resistance of the wind of speeding vehicle or to be forced up by the wind of speeding vehicle. The rear roof panel 3 in its uprise position is concave to the passenger compartment 30, in other words, the rear windshield 4 curves gently backward so as to locate its center behind opposite sides thereof in transverse and vertical directions. Accordingly, when the convertible roof assembly R is in the fully open position shown in FIGS. 5 and 6, the rear roof panel 3 that is retracted with the inner surface concave upward is desirable for the first and intermediate roof panels 1 and 2 superposed on each other to be put in a position as low as possible above the rear roof panel 3.

The convertible roof assembly R can be automatically partly opened when the side door 32 is opened for the purpose of getting on and off. Specifically, when an unlocking operation of the side door 32 or an operation of a door handle of the side door 32 is detected, the convertible roof assembly R is brought into the partly open position by automatically actuating the motor 6 mounted on the intermediate roof panel 2 to slide the front roof panel 1 backward. The convertible roof assembly R may be returned to the closed position, automatically or manually, after it has been partly opened once.

Figure 7:
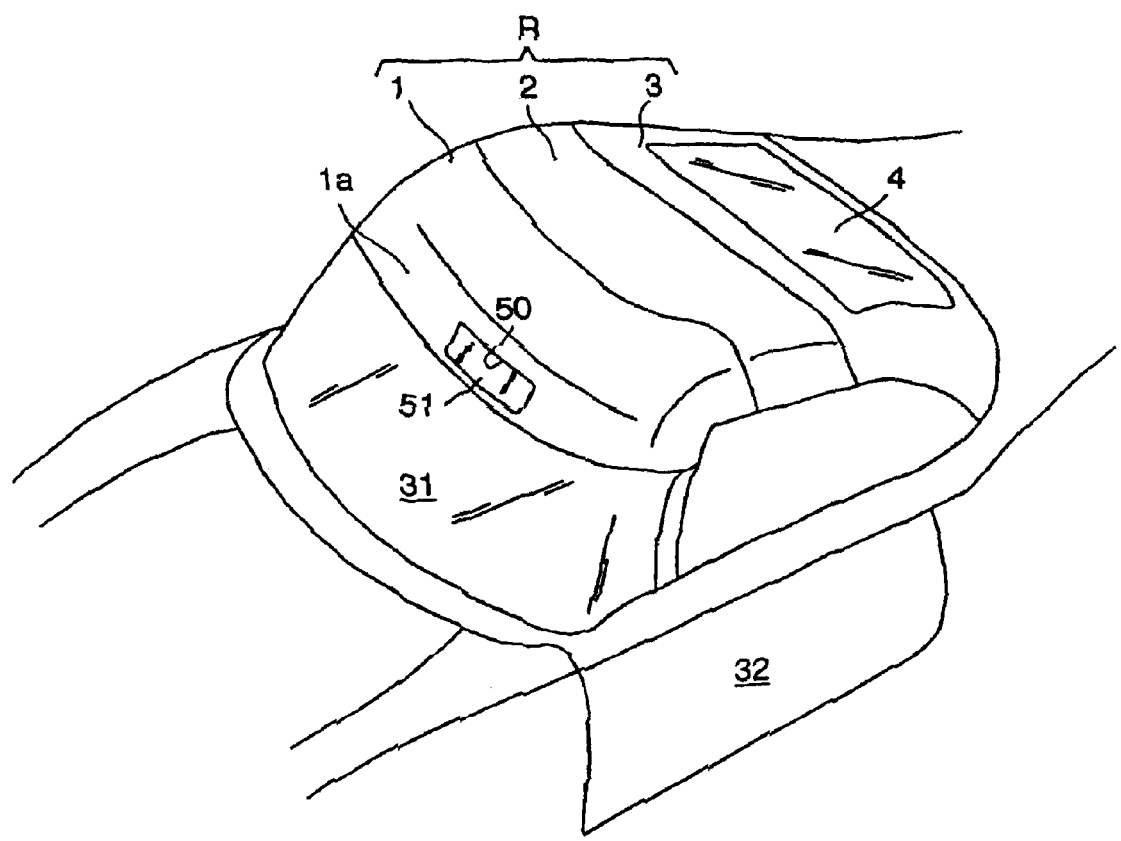
FIG. 7 is a schematic front perspective view of a roof opening.
Figure 8:
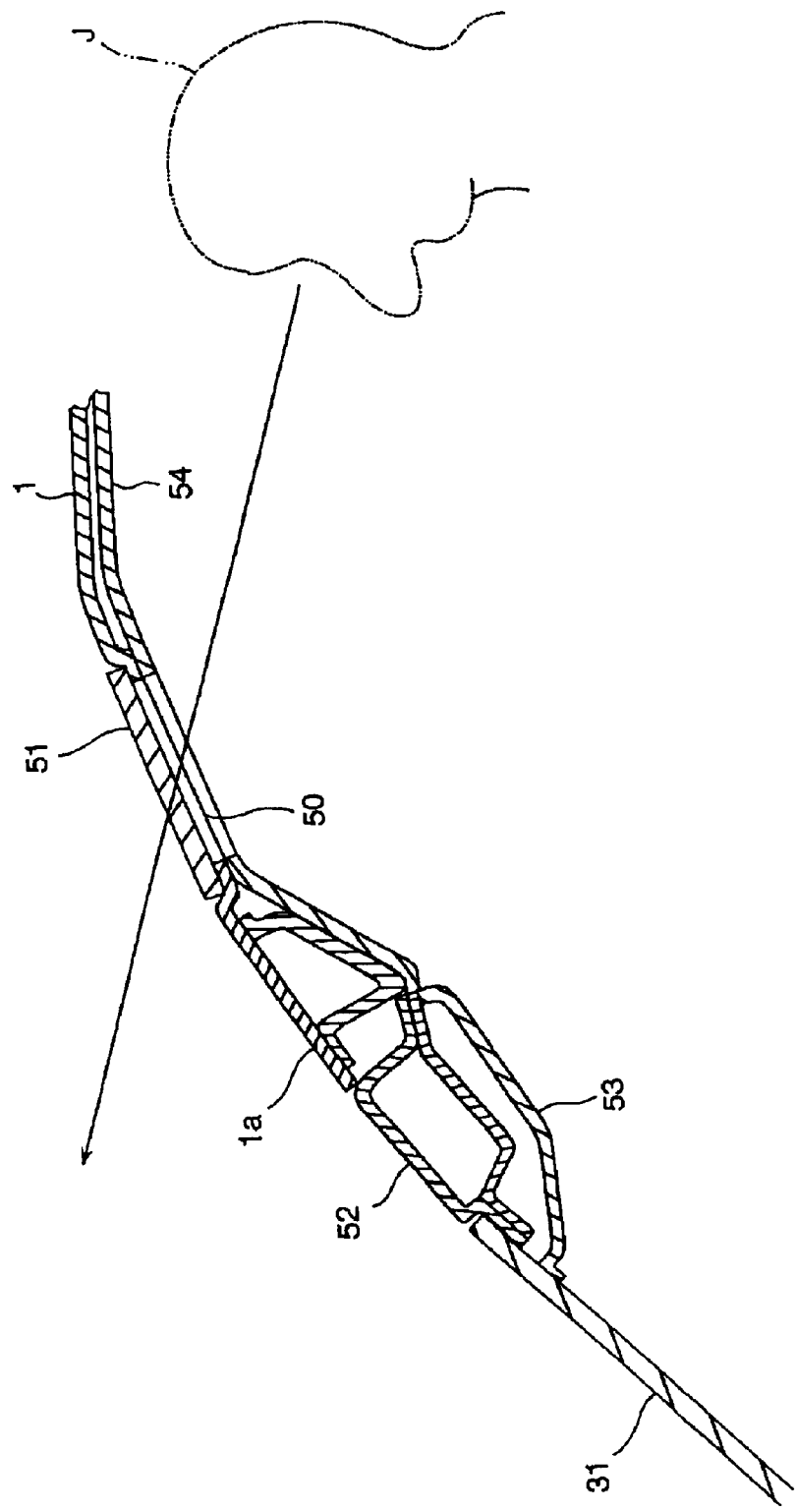
FIG. 8 is a side cross-sectional view of a front portion of a front roof panel of the convertible roof.

FIGS. 7 and 8 show the convertible roof assembly R that is structured so as to provide a clear and assured forward field of vision. The front roof panel 1 has a front portion 1a that continuously extends obliquely upward from the front header 52 of the front windshield 31. The front roof panel 1 is formed with a roof opening 50 having a transversely elongated configuration and covered by a transparent hard pane 51 adhered to the front roof panels 1. The roof opening 50 is located above the top of the front windshield 31 and in front of the head of a passenger J sitting on the passenger's seat as shown in FIG. 8. The front roof panel 1, except the roof opening 50, is covered with a trim member 54 as shown in FIG. 8. The passenger J sitting on the passenger's seat can see a forward field, especially a comparatively higher altitude of forward field, through the pane 51.

Figure 9:
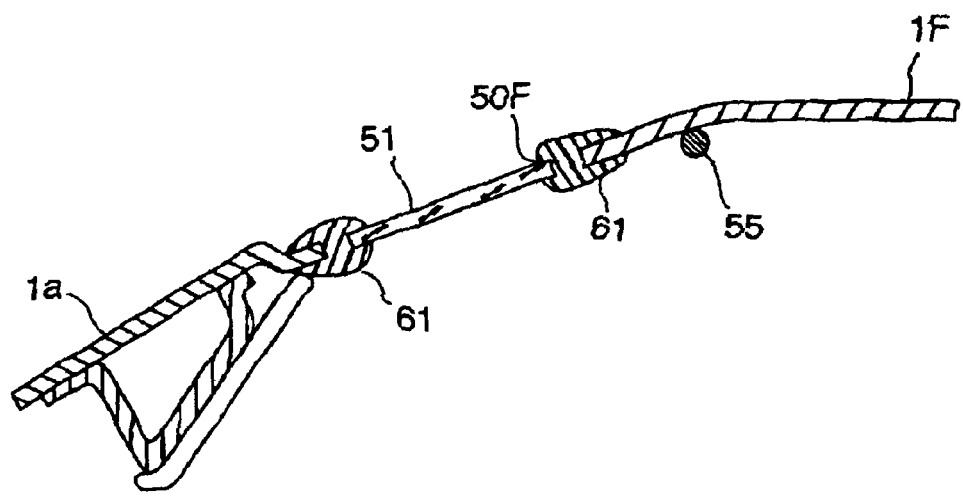
FIG. 9 is a side cross-sectional view of a front portion of a front roof panel of the convertible roof that comprises a flexible hood member.
Figure 10:
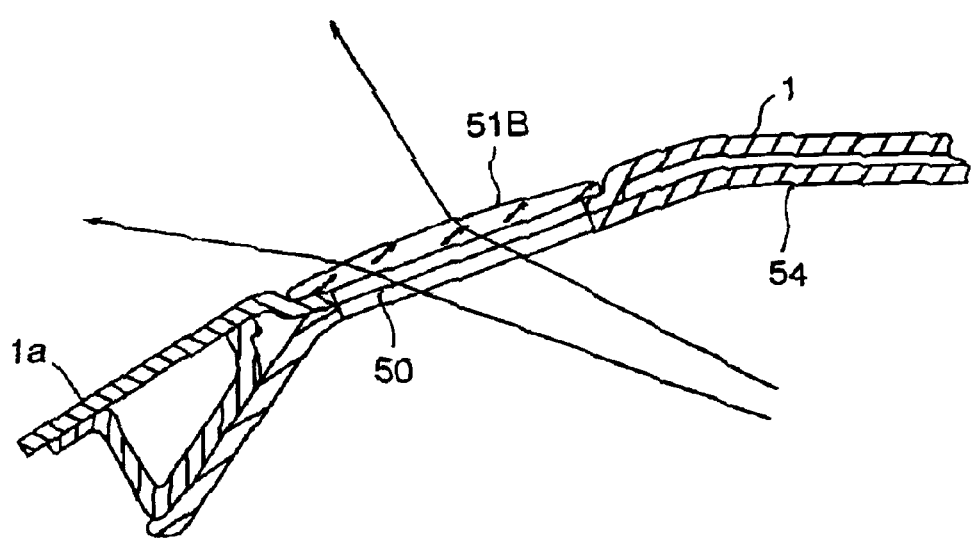
FIG. 10 is a side cross-sectional view of a variant of the front roof panel of the convertible roof in which a wide-angle lens is used as a roof pane.

As shown in FIG. 9, the convertible roof assembly R may comprise at least a flexible front hood 1F formed with a hood opening 50F similar to the roof opening 50. The flexible front hood 1F is foldable along a cross beam 55. In this instance, a transparent hard pane 51 is fitted in the hood opening 50F of the flexible front hood 1F through a soft retainer frame 61. Further, as shown in FIG. 10, the pane 51 may be replaced with a roof pane lens 51B, desirably a wide angle lens, with the intention to provide a sufficiently broad forward field of vision.

Figure 11:
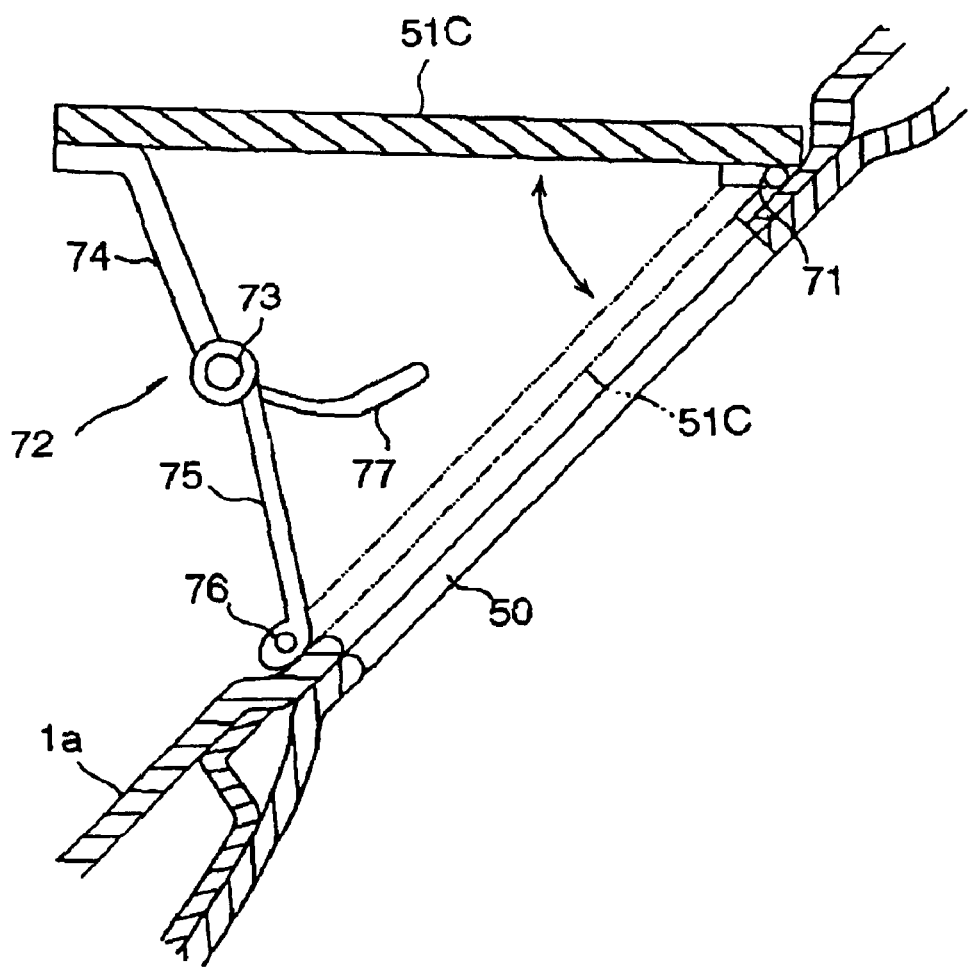
FIG. 11 is a side cross-sectional view of another variant of the front roof panel of the convertible roof in which a pop-up type roof pane is used.
Figure 12:
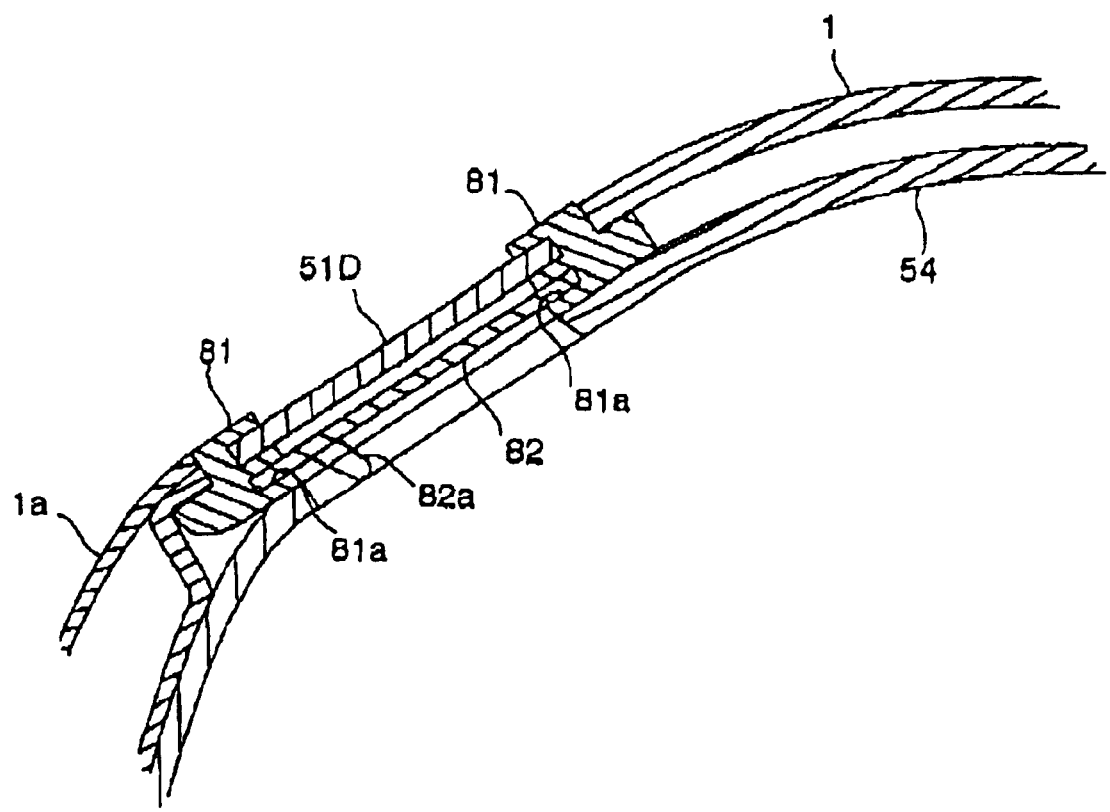
FIG. 12 is a side cross-sectional view of another variant of the front roof panel of the convertible roof in which a slidable light shielding plate is incorporated so as to cover and uncover the roof pane.
Figure 13:
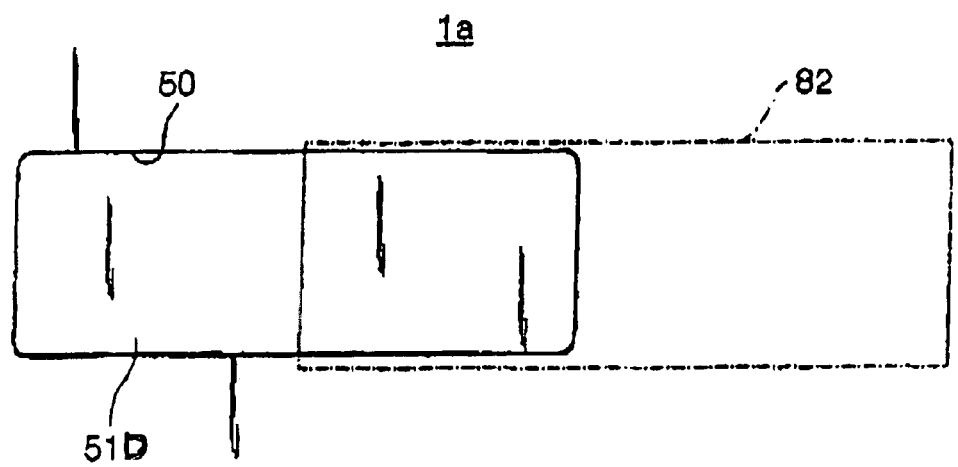
FIG. 13 is a side cross-sectional view of another variant of the front roof panel of the convertible roof in which the slidable light shielding plate is in a left half covering position.
Figure 14:
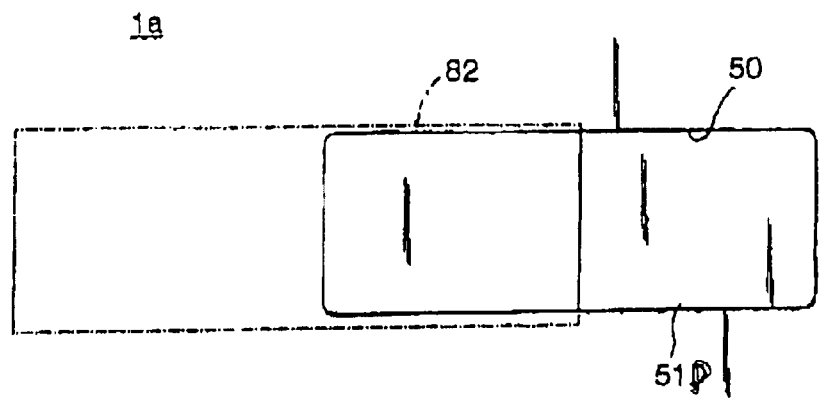
FIG. 14 is a side cross-sectional view of another variant of the front roof panel of the convertible roof in which the slidable light shielding plate is in a right half covering position.
Figure 15:
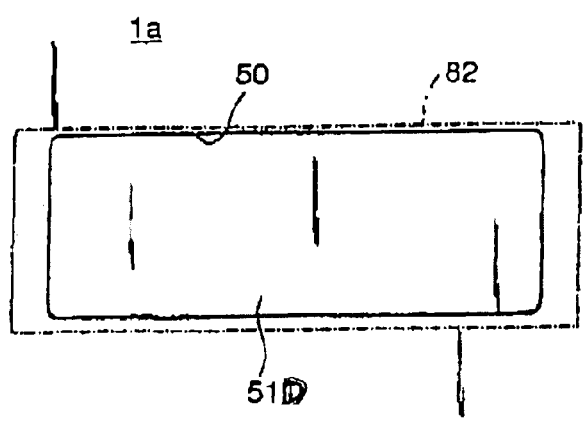
FIG. 15 is a side cross-sectional view of another variant of the front roof panel of the convertible roof in which the slidable light shielding plate is in a fully covering position.
Figure 16:
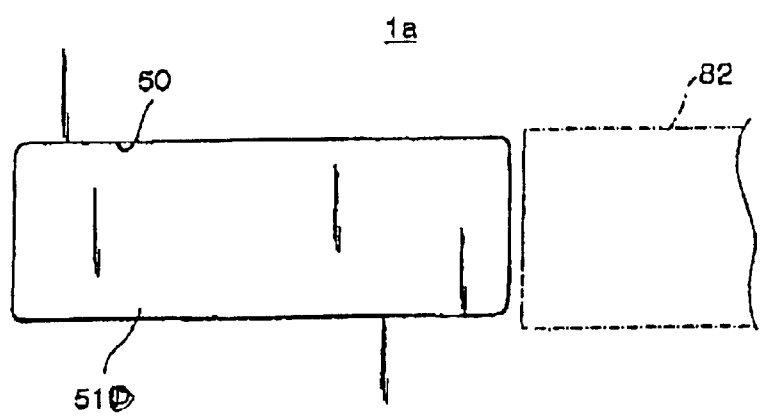
FIG. 16 is a side cross-sectional view of another variant of the front roof panel of the convertible roof in which the slidable light shielding plate is in a fully uncovering position.

FIG. 11 shows a variant of the front roof panel 1 in which a pop-up type of pane 51C is used. As shown, the pane 51C at its rear end is connected to the front roof panel 1 through a hinge 71 for pivotal movement and is provided with a foldable prop link mechanism 72. The foldable prop link mechanism 72 comprises a first prop arm 74 secured to a lower end portion of the pane 51C and a second prop arm 75 pivotally mounted on a pivot 76 secured to the front portion 1a of the first roof panel 1. The first and second prop arms 74 and 75 are pivoted on a pivot 73 so as to be folded and unfolded. Either one of the first and second prop arms 74 and 75 is provided with a handle 77 through which the pane 51C is pushed or pulled in order to be opened and closed. Specifically, when the handle 77 is pushed forward up, the first and second prop arms 74 and 75 are unfolded or stretched out, so as to turn the pane 51C about the hinge 71 to an open position from a closed position shown by a double dotted line and to hold the pane 51C in the open position. On the other hand, when the handle 77 in the open position is pulled back, the first and second prop arms 74 and 75 are unfolded, so as thereby to turn the pane 51C back to the closed position. While the pane 51C is in the open position, the pane 51C leads wind so as to easily blow into the passenger compartment.

FIGS. 12 through 16 show another variant of the front roof panel 1 that is provided with a shade shutter. As shown, a front roof panel 1 is formed with a roof opening 50 and is provided with a retainer frame 81 secured to the front roof panel 1 so as to surround the roof opening 50. A transparent pane 51D is fitted in the retainer frame 81. The retainer frame 81 is formed with upper and lower parallel guiding slots 81*a* extending in the transverse direction in close proximity to upper and lower edges of the pane 51D. A slidable light shielding thin plate 82 is fitted in the guiding slots 81*a* for slide movement in the transverse direction. The slidable light shielding plate 82 is provided with a handle 82*a*. The slidable light shielding plate 82 is slid in the transverse direction by grasping and pushing or pulling the handle 82*a* so as to cover or uncover the pane 51D. The slide plate 82 can be shifted to different positions, namely a left half covering position shown in FIG. 13, a right half covering position shown in FIG. 14, a fully covering position shown in FIG. 15, and a fully uncovering position shown in FIG. 16. In the left half covering position, the slide plate 82 covers a left half of the pane 51D so as to provide a forward field of vision through a right half area of the window 50 only. This left half covering position is desirable for the passenger of a right-handle drive car or the driver of a left-handle drive car to be shielded from dazzling sunlight from the forward left. In the right half covering position, the slide plate 82 covers a right half of the pane 51D so as to provide a forward field of vision through a left half area of the window 50 only. This right half covering position is desirable for the driver of a right-handle drive car or the passenger of a left-handle drive car to be shielded from dazzling sunlight from the forward left. In the fully covering position, the slide plate 82 covers entirely the pane 51D so as to shield both driver and passenger from head-on sunlight. Further, in the fully uncovering position, the slide plate 82 uncovers entirely the pane 51D so as to provide a forward field of vision through the entire area of the window 50. This fully uncovering position is desirable in order to preferentially assure the driver and/or the passenger of a wide forward field of vision or in the state where the driver and/or the passenger are not exposed to head-on blazing sunlight nor to blazing sunlight from the forward right or left through the window 50.

Although, the roof construction of the present invention has been described in connection with a convertible type of roof, it can be realized in any type of stationary roof that has no movable portion with respect to a vehicle body. In addition, the transparent pane 51, 51B, 51C may be replaced with a liquid crystal plate that is changeable between a transparent state and an opaque state according to presence or absence of a voltage, or otherwise with a dark-tinted glass (a kind of smoky glass which is sufficiently low in light transmission). Further, the pane 51, 15B, 51C may be hard or soft. The front roof panel 1 may have a front portion extending upright or obliquely downward in place of the front portion 1*a* extending obliquely upward. In any case, the front portion la may take any form as long as it extends above the top of the front pane 31 so as to block forward sight from the passenger compartment. The pane may extend over the transverse width of the front roof panel 1.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A roof construction for a convertible roof of a vehicle that variably covers and uncovers a roof space above a passenger compartment of said vehicle body, said roof construction comprising:

a roof assembly operative to cover and uncover said roof space, said roof assembly being movable relative to said vehicle body in a longitudinal direction of said vehicle body from the front to the back so as to selectively shift between three positions, namely a closed position where said convertible roof covers a roof space above a passenger compartment of a vehicle body, a partly open position where said convertible roof partly uncovers said roof space and a fully open position where said convertible roof fully uncovers said roof space; and prop link means for shifting said roof assembly into a selected one of said three positions and to fixedly supporting said roof assembly in said selected positions;

wherein said roof assembly comprises a front roof panel positioned horizontally in said closed position, an intermediate roof panel positioned horizontally in said closed position, and a rear roof panel provided with a rear windshield therein, each of said three roof panels being movable in said longitudinal direction and continuing into another roof panel adjacent to said each roof panel in said closed position so as to form a continuous smooth outer surface of said roof assembly, said front roof panel being moved rearward so as to be put in a superposed state with said intermediate roof panel in said partly open position, and said rear roof panel being laid down and stacked with said front roof panel and said intermediate roof panel in a superposed state in said fully open position.

2. A roof construction as defined in claim 1, wherein, in said fully open position, said rear roof panel is inclined with an inner surface facing upward and said front roof panel and said intermediate roof panel in said superposed state are put approximately horizontally.

3. A roof construction as defined in claim 2, wherein said rear roof panel is laid so as to put a rear end thereof approximately even with a front end of a rear body portion of said vehicle body and a front end thereof spatially below said rear end of said rear body portion.

4. A roof construction as defined in claim 2, wherein said vehicle body has a storage space between a trunk compartment and a rearmost seat which receives said rear roof panel stacked with said front roof panel and said intermediate roof panel in a superposed state so as to lay said front roof panel and said intermediate roof panel in a superposed state approximately horizontally and even with a front end of a trunk lid.

5. A roof construction for a convertible roof of a vehicle that variably covers and uncovers a roof space above a passenger compartment of said vehicle body, said roof construction comprising:

a roof assembly operative to cover and uncover said roof space, said roof assembly being movable relative to said vehicle body in a longitudinal direction of said vehicle body from the front to the back so as to selectively shift between three positions, namely a closed position where said convertible roof covers a roof space above a passenger compartment of a vehicle body, a partly open position where said convertible roof partly uncovers said roof space and a fully open position where said convertible roof fully uncovers said roof space; and prop link means for shifting said roof assembly into a selected one of said three positions and to fixedly supporting said roof assembly in said selected positions;

wherein said roof assembly has a front end portion extending upward continuously from a top edge of a front windshield of said vehicle, said front end portion being provided with a roof opening covered by a transparent pane panel through which a passenger in said vehicle gains forward vision is movable so as to uncover said roof opening.

6. A roof construction as defined in claim 5, and further comprising a light shielding plate movable between at least a fully covering position where said light shielding plate covers fully said transparent panel and a fully uncovering position where said light shielding plate uncovers fully said transparent panel.

7. A roof construction as defined in claim 5, wherein said transparent panel comprises a wide angle lens.

8. A roof construction as defined in claim 5, wherein said roof assembly comprises a front roof panel positioned horizontally in said closed position, an intermediate roof panel positioned horizontally in said closed position, and a rear roof panel provided with a rear windshield therein, each of said three roof panels being movable in said longitudinal direction and continuing into another roof panel adjacent to said each roof panel in said closed position so as to form a continuous smooth outer surface of said roof assembly, said front roof panel being moved rearward so as to be put in a superposed state with said intermediate roof panel in said partly open position, and said rear roof panel being laid down and stacked with said front roof panel and said intermediate roof panel remaining superposed state in said fully open position.

* * * * *